Oct. 7, 1969 G. L. BUENGER ET AL 3,471,701

RADIATION SENSITIVE TRANSDUCING SYSTEM

Filed July 19, 1967 5 Sheets-Sheet 1

INVENTORS:
George L. Buenger
Robert S. Erickson

By Smyth, Roston & Pavitt
ATTORNEYS

INVENTORS:
George L. Buenger
Robert S. Erickson

By Smyth, Roston & Pavitt
ATTORNEYS

INVENTORS:
George L. Buenger
Robert S. Erickson
By Smyth, Roston & Pavitt
ATTORNEYS INVENTORS:
George L. Buenger
Robert S. Erickson
By Smyth, Roston & Pavitt
ATTORNEYS

RADIATION SENSITIVE TRANSDUCING SYSTEM

INVENTORS:
George L. Buenger
Robert S. Erickson
By Smyth, Roston & Pavitt
ATTORNEYS

United States Patent Office 3,471,701
Patented Oct. 7, 1969

3,471,701
RADIATION SENSITIVE TRANSDUCING SYSTEM

George L. Buenger, Champaign, and Robert J. Erickson, St. Joseph, Ill., assignors to The Magnavox Company, Ft. Wayne, Ind., a corporation of Delaware Filed July 19, 1967, Ser. No. 654,650
Int. Cl. G01n 21/30
U.S. Cl. 250—219 14 Claims

ABSTRACT OF THE DISCLOSURE

This invention relates to a system for modulating at a particular frequency the signals produced by a photocell to represent the characteristics of an image at progressive positions on a document. The system is particularly adapted to be used in a facsimile equipment and includes a current control member such as a transistor which is triggered alternately to the conductive and non-conductive states at the particular frequency. The transistor is connected to the photocell to discharge the distributed capacitance in the photocell during the state of conductivity in the transistor. Means are also included in the system for compensating for the effects of the distributed capacitance in the transistor.

Since the distributed capacitance in the photocell is discharged in each cycle, the response of the photocell at relatively high frequencies is not limited. This allows the intensity of the light impinging on the photocell from the image to be relatively great. In view of this, optical filters may be included with characteristics to insure that the system is able to reproduce, an image in black-and-white regardless of the colors, including such color as red, in the image which is to be reproduced.

This invention relates to a system for converting an image on a document into electrical signals having characteristics representative of the image at different positions and for modulating these electrical signals at a particular frequency. The invention particularly relates to the use of such a transducing and modulating system in equipment for transmitting facsimile information through telephone lines and telephone handsets between a pair of spaced positions.

A system has been developed and manufactured and successfully operated by the assignee of record of this application for converting an image at a first position into audio frequency signals having characteristics representative of the image and for transmitting the signals through a telephone handset at the first position and through telephone lines to a second position removed from the first position. The signals then pass through a telephone handset at the second position, which may be thousands of miles distant from the first position. The system then operates to the signal at the second position and reproduce the image from the detected signals.

The conversion of the image at the first position is accomplished by placing on an arcuate platen a document holding an image and by rotating a transducer past the platen. As the transducer is rotated, the document is moved axially so that a scan of successive lines on the document is obtained. The transducer includes a lamp for directing light toward the arcuate pattern for reflection by the document on the platen. The transducer further includes lenses which are rotatable to receive the light reflected from progressive positions on the document and to concentrate and direct such light so that the light can be received by a photocell. In this way, the signal produced by the photocell at each instant has amplitude characteristics which indicate whether the image being scanned at the particular position on the document is light or dark or gray.

In the system now being manufactured by the assignee of record of this application, means are provided for modulating the electrical signal from the photocell at a particular frequency so that the modulated signal can thereafter be amplified by alternating current amplifiers. Amplification of the signal by alternating current amplifiers is advantageous for several reasons. One reasoin is that AC signals do not present problems of drift as do DC amplifiers. Furthermore, AC amplifiers are more sensitive and reliable than DC amplifiers. Another advantage of providing this modulation is to insure that the signals representing the characteristics of the image at each instant will be transmitted at a particular frequency through the telephone handset at the first position, the telephone lines and the telephone handset at the second position. This insures that the signals representing the facsimile information can be easily separated at the second position from the other signals in the telephone lines.

The modulating means in the system now being manufactured by the assignee of record of this application include means for mechanically chopping the light passing from the lenses to the photocell. This is accomplished by rotating a disc at a particular speed. The disc is provided around its annular periphery with spaced apertures which pass the light from the lenses to the photocell as the disc rotates. In this way, the light passing to the photocell is modulated at a frequency dependent upon the speed of rotation of the disc.

Although the system using a mechanical chopper is operating satisfactorily in the system now in use, it has become apparent through extended studies that certain advantages will be obtained by replacing the mechanical chopper with an electronic modulator. One advantage will result from an increased output at the photocell as a result of the introduction of light at all times to the photocell rather than the introduction of light only at the periodic intervals where the apertures in the disc move to a position for passing light to the photocell. This advantage of enhancing the level of the light passing to the photocell is further expanded because the light passing to the photocell with a mechanical chopper has been intentionally limited at low frequencies in view of the attenuation in the response of the photocell circuit at high frequencies. The response of the photocell has been limited at high frequencies because the photocell has a distributed capacitance which has become charged by the signal produced in the photocell by the light passing to the photocell and which has been unable to become discharged during the periods when the passage of light to the photocell has been blocked by the rotating disc.

The relatively low level of the light passing to the photocells in the facsimile systems now in use have produced other limitations which have not prevented the system from being operative but which have inhibited full operation of the system under certain conditions. For example, the low level of the light in the photocell has tended to inhibit the facsimile transducer at the first position from responding fully to image in certain colors such as red. This has limited the capabilities of the system at the second position from reproducing as a black-and-white image those portions of the red image at the first position.

This invention provides a system for accomplishing the advantages discussed above. The system includes electronic stages for producing a modulating signal at a particular frequency and for modulating the output from the photocell with these signals at the particular frequency. The electronic circuitry offers advantages since it compensates for any distributed capacitances in the circuitry and produces modulating signals which are independent of the effects of any such distributed capacitances. By producing the modulating signals electronically and modulating the signals from the photocell with these electronically produced signals, the photocell is able to receive at each instant the light reflected from the document in representation of the image on the document and is able to produce a signal of considerably enhanced intensity relative to that produced when a mechanical chopper is used. This is especially true in view of the fact that the photocell output is not attenuated at high frequencies when the modulating signal is produced electronically. The photocell output is not attenuated at high frequencies since the charges produced in the distributed capacitance of the photocell are discharged through the electronic stages in each cycle of the modulating voltage.

The electronic stages producing the modulating signals include a current control member such as a transistor which is alternately made conductive and non-conductive on a periodic basis to produce the modulating signals at the particular frequency. The current control member such as the transistor is connected to the photocell to discharge the distributed capacitance in the photocell during the time that the transistor is conductive. The transistor also has some distributed capacitance which tends to produce undesirable signals. Means are included in the electronic stages for neutralizing the effects of such distributed capacitance in the transistor.

As previously described, the signal produced at the photocell by the system constituting this invention is considerably enhanced in intensity relative to the intensity of the signal produced at the photocell with a mechanical chopper. Because of this, filters can be provided with characteristics to operate in conjunction with the characteristics of the photocell to obtain a reproduction in black and white at the second position of the image at the first position regardless of the color or colors of the image at the first position. For example, the photocell may be provided with characteristics whereby the response of the photocell rises sharply with increases in wavelength through the visual range of wavelengths. By providing a filter with peak response characteristics at a frequency corresponding to the yellow color and with sharply falling characteristics at wavelengths corresponding to such colors as blue, green and red, the system at the second position is able to reproduce yellow colors as white and to reproduce blue, green and red colors as dark. In this way, the image at the second position constitutes a true reproduction in black and white of any image in color at the first position, regardless of the particular colors or the number of colors in the image at the first position.

Figure 3:
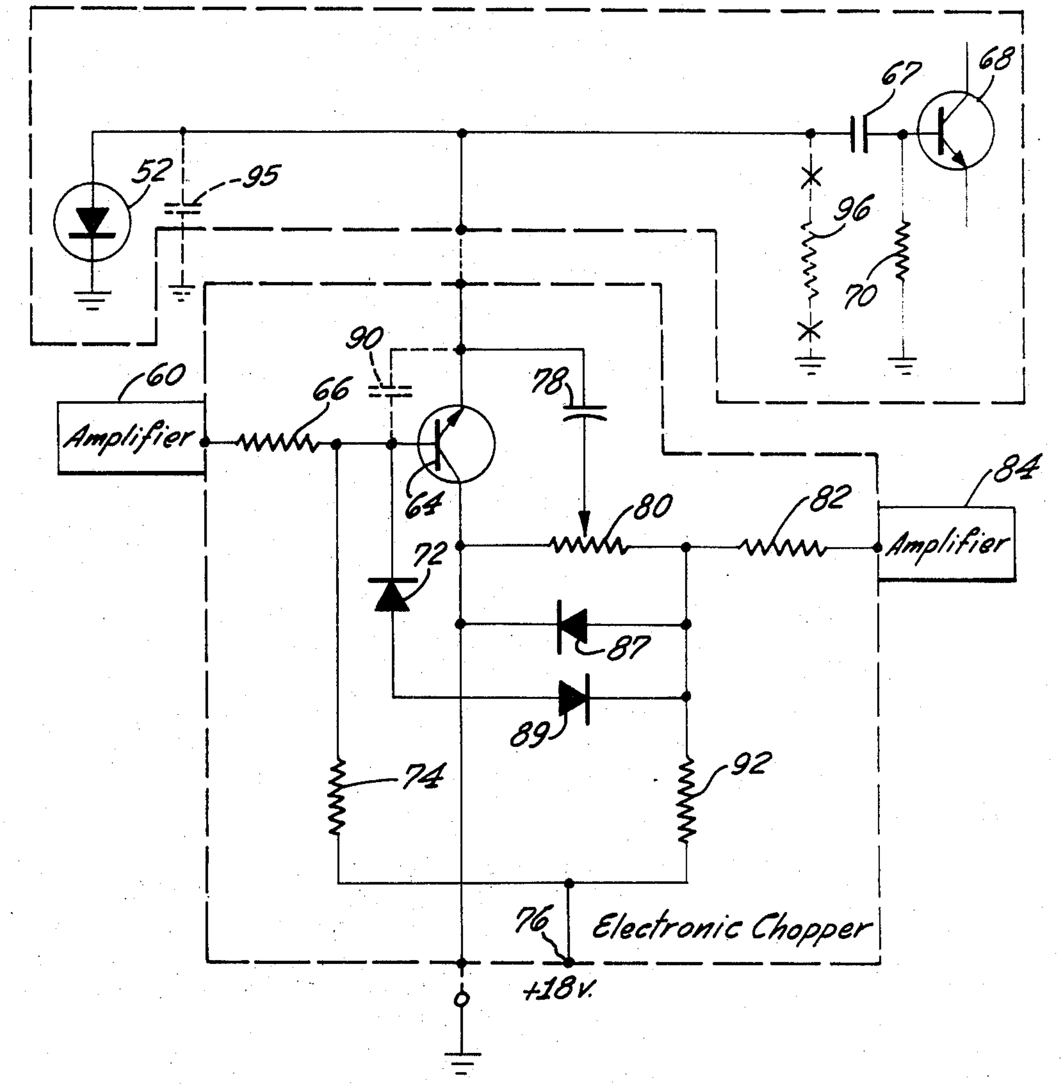
FIGURE 3 is a circuit diagram of the electrical circuitry which is included in the system constituting this invention.
Figure 4:
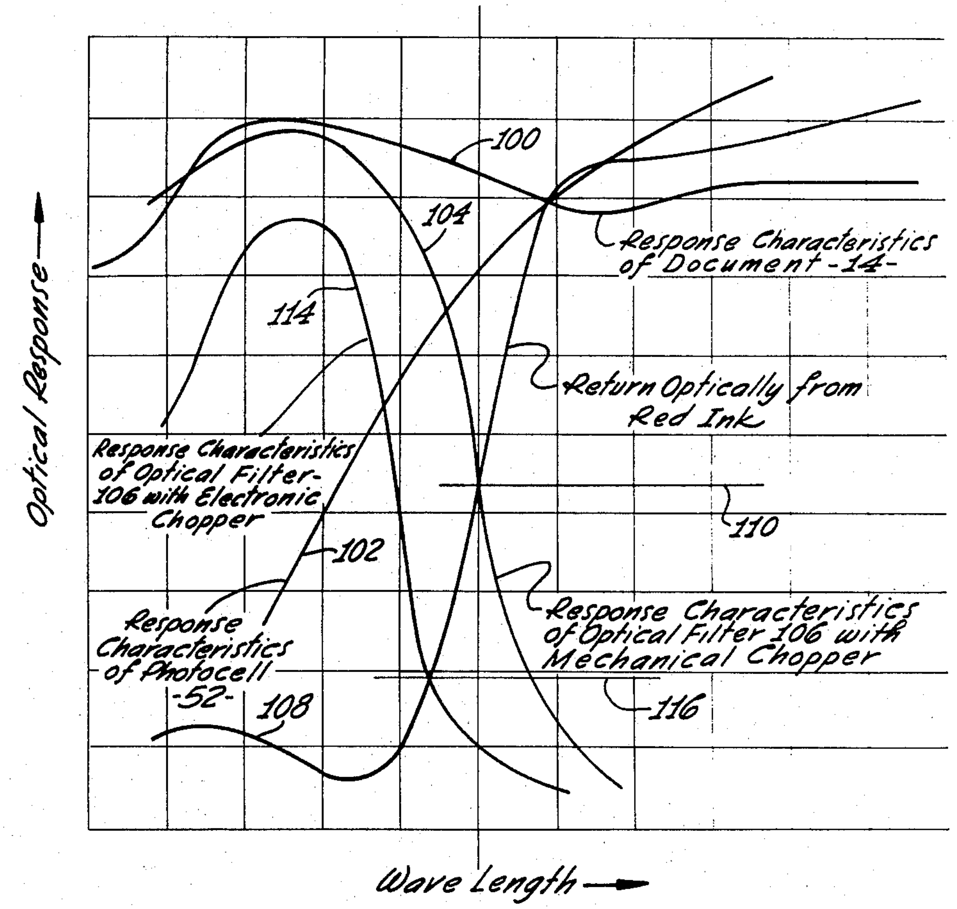
Figure 5:
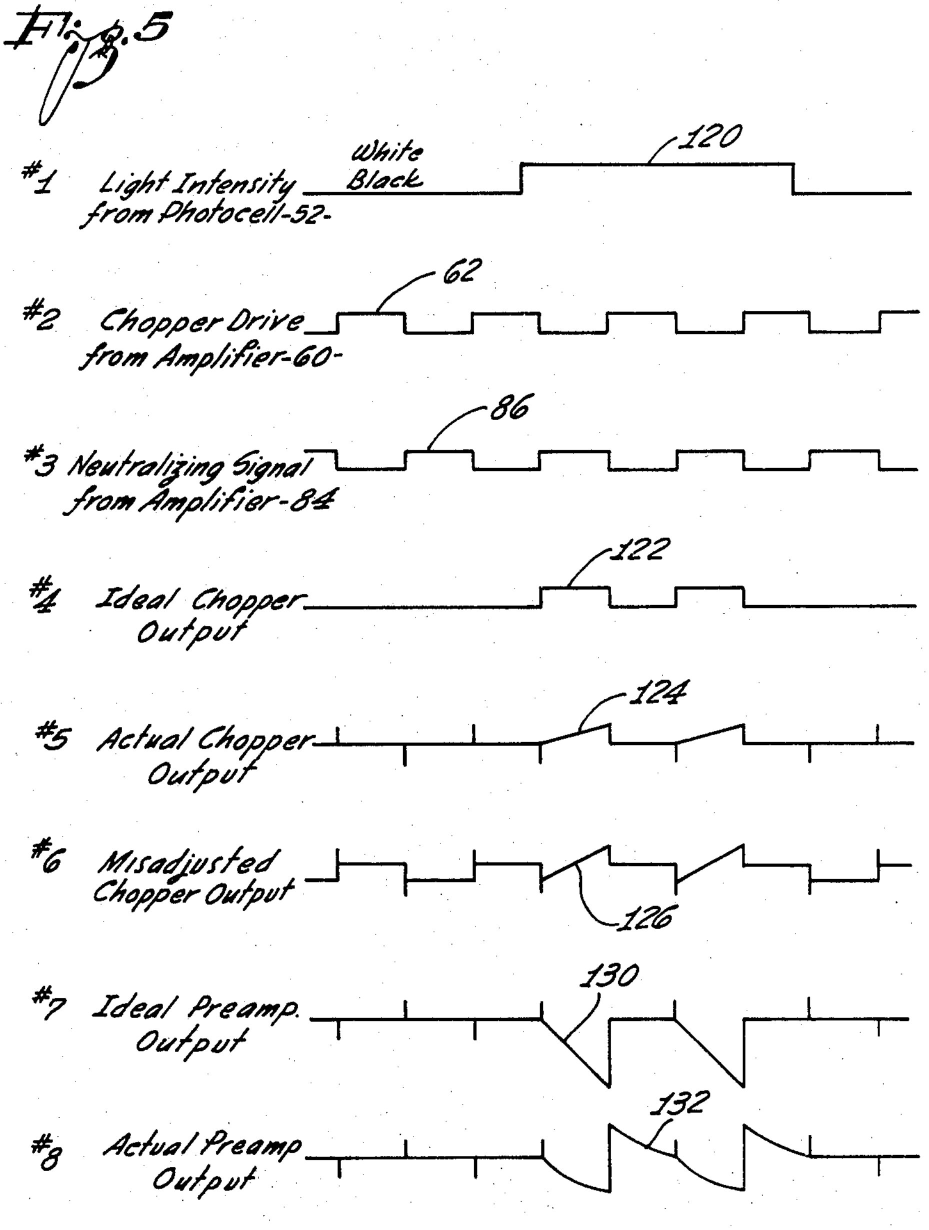
Figure 6:
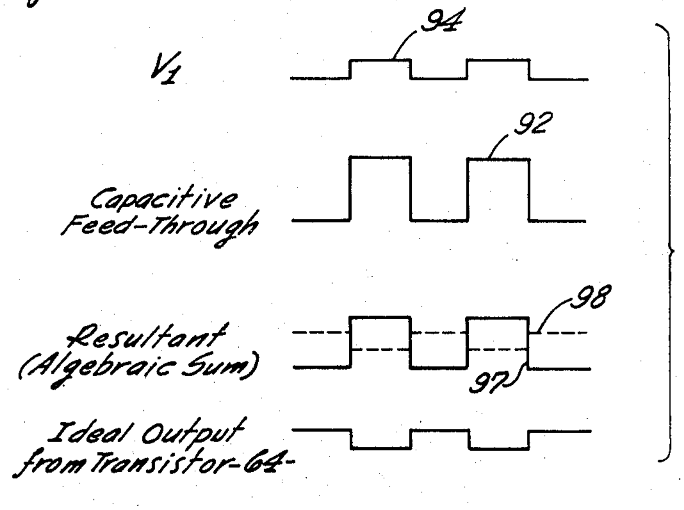
Figure 7:
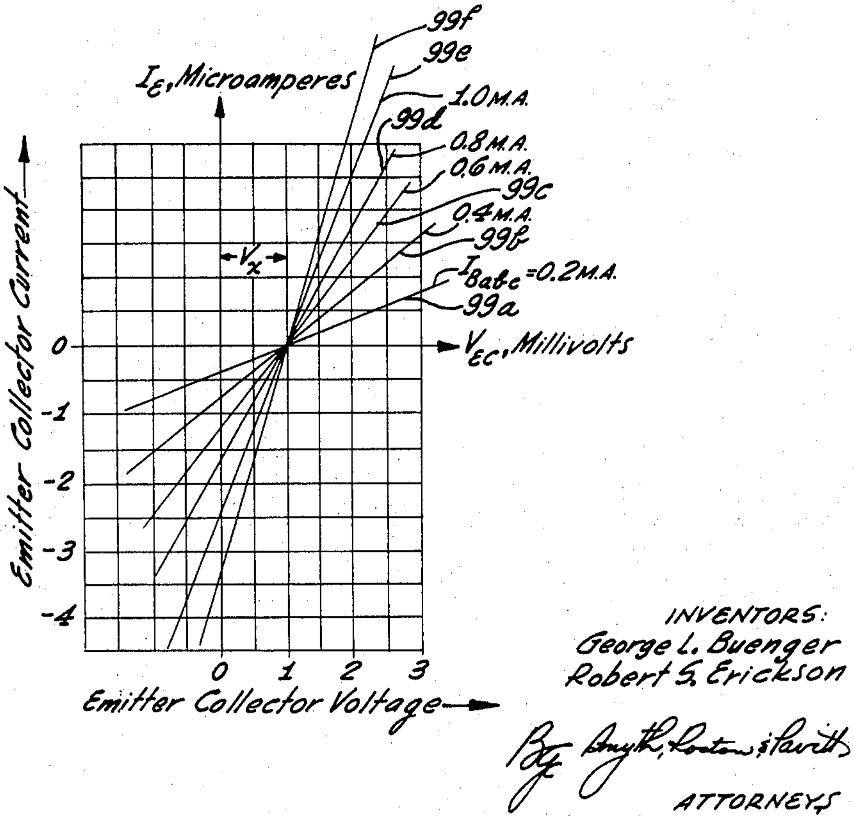

FIGURE 4 constitutes curves illustrating the response characteristics through the visible range of wavelengths of particular ones of the optical components shown in FIGURE 3;

FIGURE 5 illustrates voltage waveforms at certain strategic terminals in the electronic circuitry illustrated in FIGURE 3;

FIGURE 6 illustrates voltage waveforms at other strategic terminals in the electronic circuitry illustrated in FIGURE 3; and FIGURE 7 illustrates the response characteristerics on an amplified basis of one of the transistors included in the electronic circuitry illustrated in FIGURE 3.

The system constituting this invention is adapted to be used primarily with a facsimile system similar to that disclosed and claimed in copending application Ser. No. 549,759, now abandoned, filed in the names of Glenn A. Reese and Paul J. Crane and assigned of record to the assignee of record of this application and disclosed and claimed in application Ser. No. 436,504, now abandoned, filed in the name of Glenn A. Reese and Gustavus B. Pearson on Mar. 2, 1965, and also assigned of record to the assignee of record of this application. This facsimile system includes identical equipment at a first position and at a second position which may be removed from the first position by a distance up to thousands of miles. Each of the facsimile equipments at the first and second positions includes a housing 10 which supports an arcuate platen 12 for receiving a document 14. A motor 16 drives a turntable 18 which supports transducers generally indicated at 20 and 22. The transducer 20 is constructed to provide a conversion of light on the document 14 at the transmitter into electrical signals having characteristics representative of the image at each position on the document. The transducer 22 is adapted to convert such electrical signals into corresponding marks on the document 14 at the second position. A switch 26 is provided for activating either the transducer 20 or the transducer 22 so that particular equipment is able at one time to convert an image on a document into electrical signals or to convert electrical signals into an image on a document but not both simultaneously.

Figure 1:
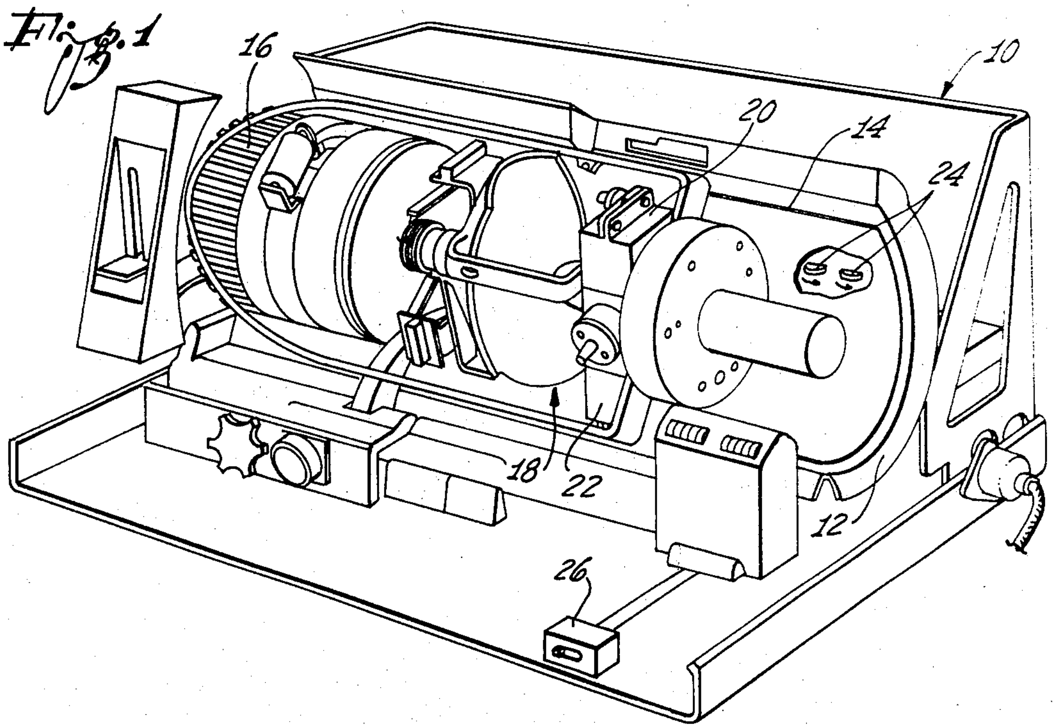
FIGURE 1 is a perspective schematic view of a facsimile system in which the system constituting this invention may be used.

The motor 16 drives the turntable 18 at a particular speed as a result of controls provided on the motor by a tuning fork or a crystal in a crystal oscillator. By providing such controls over the operation of the motor, the rotary scanning of the image on the document 14 at the first position occurs in synchronism with the rotary scanning of the document at the second position so that the image is reproduced at the second position in synchronism with the scanning of the image on the document at the first position. The motor 16 also controls the operation of mechanisms for moving the documents in the axial direction at the first and second positions so that the documents can be scanned in successive lines. The mechanism for advancing the documents 14 in the axial direction at the first and second positions is indicated schematically at 24 in FIGURE 1.

Figure 2:
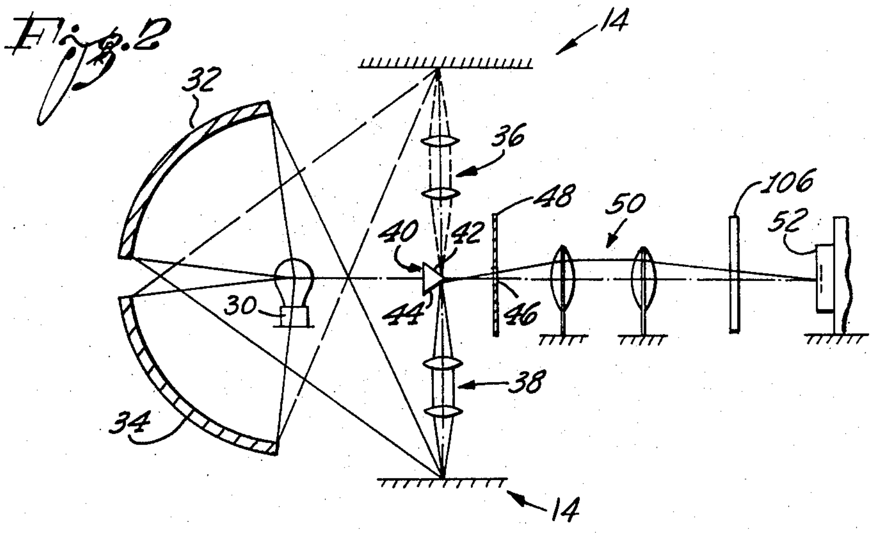
FIGURE 2 is a schematic view of the optical features which are included in the system constituting this invention.

FIGURE 2 illustrates in further detail the transducer system for converting the image at progressive positions on the document 14 into electrical signals having characteristics representing this image. As illustrated in FIGURE 2, light from a lamp 30 is reflected by a pair of semi-parabolic reflecting mirrors 32 and 34 mounted on the turntable 18. The reflecting mirrors 32 and 34 have the properties of focusing the light into a pair of diametrically disposed spots at a position corresponding to the disposition of the document 14 on the arcuate platen 12. As the turntable 18 rotates through each revolution, the light spot produced by the mirror 32 scans the document through an angle of 180° and then the light produced by the mirror 34 scans the document through the remaining angle of 180°. This causes an amount of light to be reflected from the document at each instant in accordance with the characteristics of the position being scanned on the image at that position. The light spot produced by the mirror 32 and reflected from the document 14 passes through a lens system 36 to a prism 40. The lens system 36 focuses on a reflecting surface 42 of the prism 40 the light produced by the mirror 34 and reflected from the document 14. In like manner, a lens system 38 focuses on a reflecting surface 44 of the prism 40 the light focused by the mirror 32 on the document so as to be reflected from the document.

The prism 40 is supported by the turntable 18 so as to be rotated with the turntable. In this way, light passes to the reflecting surface 42 of the prism 40 through an angle of 180° in each revolution of the turntable and light passes to the reflecting surface 44 through the remaining angle of 180° in each revolution of the turntable. The light reflected from the surfaces 42 and 44 pass through an aperture 46 in a disc 48 which is rotated in synchronism with the turntable 18. The aperture 46 is substantially on the axis of rotation of the disc 48 and the turntable 18 and in line with the beams reflected by the surfaces 42 and 44 of the prism 40. The size of the aperture 46 corresponds optically to the size of the light spots focused on the document 14 by the mirrors 32 and 34. For example, this spot size may be in the order of 0.007" in a direction parallel to the axis of the platen 12 and 0.010" in the annular direction. By rotating the disc 48 with the turntable 18, the angular aperture 46 is always aligned optically with the lens systems 36 and 38 so that the scan area being resolved by the aperture will always be a rectangle aligned circumferentially with the document 14 on the platen 12.

A lens system 50 is disposed on the axis of the disc 48 to focus on a photocell 52 the light passing through the aperture 46 in the disc. The lens system 50 is preferably not rotatable with the disc 48 and preferably includes at least a pair of lenses that are adjustable relative to each other to insure that the light passing through the aperture 46 will be focused accurately on the photocell 52. The photocell 52 produces at each instant an electrical signal having an amplitude related to the charactreistics of the image at the position being scanned on the document 14 at that instant. As will be seen, no mechanical chopper is disposed between the lens system 50 and the photocell 52 so that the photocell receives light from the document at each instant.

FIGURE 3 illustrates an electronic circuit for use in conjunction with the photcell 52 to modulate the output from the photocell at a particular frequency. The circuitry shown in FIGURE 3 includes means connected to the motor 16 for producing signals at a particular frequency related to the speed of the motor. Such means may include an amplifier 60 for amplifying and squaring the signal from the motor and for changing the frequency of the signal by an integral value to produce a square-wave signal illustrated at 62 in FIGURE 5. The signal 62 from the amplifier 60 passes to the base of a transistor 64 through a resistor 66 having a suitable value in the order of 9.1 kilohms. The semiconductor 64 may constitute a 2N2369 and the photocell 52 may constitute a type 58C manufactured by the Hoffman Electronics Corporation of Los Angeles, California.

The emitter of the transistor 64 and the output terminal of the photocell 52 are connected to one terminal of a coupling capacitor 67, the other terminal of which is connected to the base of a suitable transistor 68 in a preamplifier stage. The base of the transistor 68 is also connected to one terminal of a resistor 70, the second terminal of which is grounded. The output from the transistor 68 is obtained from the collector of the transistor.

A diode 72 is connected between the base and collector of the transistor 64 with the cathode of the diode connected to the base of the transistor and the plate of the diode connected to the collector of the transistor. The diode 72 may be a type 1N96. A resistor 74 having a suitable value in the order of 33 kilohms is connected between the base of the transistor and a terminal 78 providing a suitable positive voltage such as 18 volts. The collector of the transistor 64 is connected to a suitable reference potential such as ground.

A capacitor 78 having a suitable value in the order of 20 picofarads extends electrically between the emitter of the transistor and the movable arm of a potentiometer 80, which may be provided with a suitable value in the order of 5 kilohms. One terminal of the potentiometer 80 is connected to the collector of the transistor and the other terminal of the potentiometer is connected to receive a signal through a resistor 82 having a suitable value in the order of 7.5 kilohms. This signal is applied from an amplifier 84 which may be constructed in a manner similar to the amplifier 60 to provide signals 86 (FIGURE 5) with rectangular characteristics and at a frequency corresponding to the frequency of the signal 62 from the amplifier 60.

A pair of diodes 87 and 89 are in parallel with the potentiometer 80. The diodes 87 and 89 are connected in reverse relationship so that the diode 87 will pass a positive signal from the amplifier 84 and the diode 89 will pass a negative signal from the amplifier 84. Each of the diodes 87 and 89 may be a type 1N96. A resistor 92 having a value in the order of 33 kilohms is connected between the positive terminal 76 and the terminal common to the potentiometer and the resistance 82.

As will be seen from FIGURE 5, the signal 62 from the amplifier 60 constitutes a square wave. This square wave is introduced to the transistor 64 so that the transistor will become conductive at substantially a saturable level during the positive half of the square wave and will become non-conductive during the negative half of the square wave. The resistors 66 and 74 constitute a voltage dividing network to insure that the voltage swing of the square wave signal 62 occurs equally above and below a desired mid point value to obtain a swing of the transistor 64 between the non-conductive and saturably conductive states. The diode 72 is included to limit any negative swing of the square wave to a value which will produce non-conductivity of the transistor 64 without extending the voltage swing on the base of the transistor excessively below that producing the non-conductive state of the transistor.

The transistor 64 includes a distributed capacitance between its base and emitter. This distributed capacitance is illustrated in broken lines at 90 in FIGURE 3. The distributed capacitance is disadvantageous since it tends to pass the signal 62 from the base to the emitter of the transistor 64. This capacitive signal is illustrated at 92 in FIGURE 6 and is directly out-of-phase with the signal 94 produced on the emitter of the transistor 64 by the operation of the input signal 62 in controlling the conductivity of the transistor 64. If no attempt were made to counteract the effect of the signal 92 produced on the emitter of the transistor 64 as a result of the operation of the distributed capacitance 90, the resultant output signal on the emitter of the transistor 64 would be illustrated at 97 in FIGURE 6.

The signal 86 is introduced from the amplifier 84 to the emitter of the transistor 64 to counteract and neutralize the effect of the signal 92 passing through the distributed capacitance 90. The neutralizing effect of the signal 86 results from the fact that it is 180° out-of-phase with the signal passing through the distributed capacitance 90. This neutralizing signal is illustrated at 98 in FIGURE 6. The amplitude of the signal 98 is limited in the positive direction by the operation of the diode 87 and is limited in the negative direction by the operation of the diode 89. The potentiometer 80 is included so that the movable arm of the potentiometer can be adjusted to a position which will insure that the amplitude of the signal passing to the emitter of the transistor 64 from the amplifier 84 will exactly counterbalance and neutralize the signal passing through the distributed capacitance 90 to the emitter of the transistor.

The circuit described above has other advantages of some importance. For example, the photocell 52 has a distributed capacitance which is indicated in broken lines at 95. This capacitance becomes charged by the photocell 52 as the image on the document 14 is scanned at successive positions. When a mechanical chopper is used, the distributed capacitance 95 does not have an opportunity to become discharged through the mechanical chopper. Because of this, a resistance indicated in broken lines at 96 in FIGURE 3 has had to be included to provide a discharge path for the distributed capacitance 95 across the photocell 52. However, the resistance 96 has had to be provided with a somewhat high value in order to insure that the impedance across the transistor 68 remains sufficiently high to pass the signal from the photocell 52. The relatively high value of the resistance 96 has caused the RC time constant of the capacitance 95 and the resistance 96 to be so great that it has been difficult to discharge the distributed capacitance fully in each half cycle. This has limited the response of the photocell to high frequencies.

The use of the electronic chopper shown in FIGURE 3 has provided certain advantages in providing a discharge of the distributed capacitance 95 in each cycle of the voltage from the electronic chopper. Specifically, when the transistor 64 becomes conductive in each cycle of voltage from the chopper, it provides a low impedance path to ground for the discharge of the distributed capacitance 95. This has allowed the resistance 96 to be eliminated from the electronic chopper shown in FIGURE 3. Since the distributed capacitance 95 is becoming discharged in each cycle of voltage from the electronic chopper, the response of the photocell 52 at high frequencies is no longer limited. In view of this, the full output of the photocell 52 can be introduced to the transistor 68 rather than an attenuated output from the transistor as has been required when the mechanical chopper has been used.

To provide a proper response for the circuit shown in FIGURE 3, the output from the photocell 52 is initially masked. The position of the movable arm in the potentiometer 80 is then adjusted so that no output at the chopper frequency is obtained from the transistor 68. As previously disclosed, the movable arm of the potentiometer 80 is adjusted to a position so that the signal passing from the amplifier 60 through the distributed capacitance 90 is neutralized by the signal passing through the capacitance 78 from the amplifier 84. The movable arm of the potentiometer 80 is also adjusted to a position to compensate for any offset in the relationship between the voltage across the transistor and the current through the transistor. Theoretically, the curves illustrating the current between the collector and the emitter of the transistor 64 should intersect at a potential of zero volts between the emitter and collector of the transistor 64. Actually, as illustrated on an amplified basis in FIGURE 7, the curves *99a* through *99f* illustrating the relationship between emitter-collector current and emitter-collector voltage intersect at a voltage slightly different from zero. The movable arm of the potentiometer 80 is adjusted to compensate for this intersection at a voltage different from zero. As will be seen in FIGURE 7, each of the curves *99a* through *99f* represents the relationship between different emitter-collector voltages and emitter-collector currents for individual values of base-emitter currents.

FIGURE 5 illustrates the response which is obtained when the signal from the photocell is provided with characteristics similar to those indicated at 120. As will be seen, the signal 120 represents an initial scanning of a black image, a subsequent scanning of a white image and then a scanning of a black image. When the signal 62 from the amplifier 60 has characteristics corresponding to the signal 86 from the amplifier 84, a signal 122 is ideally introduced to the transistor 68 in the pre-amplifier during the time that the signal 120 has a relatively high amplitude to represent a white position on the image being scanned.

Actually, a signal 124 with ramp characteristics is produced because of the charging of the distributed capacitance 95 in the photocell 52 at a relatively slow rate during the time that the transistor 64 is non-conductive. The trailing edge of the ramp signal is relatively steep because the distributed capacitance 95 in the photocell 52 discharges fairly rapidly through the transistor 64 when the transistor becomes conductive. When the potentiometer 80 is not properly adjusted, the characteristics of the signal introduced to the transistor 68 in the pre-amplifier may be similar to those indicated at 126 in FIGURE 5.

If the signal 124 were applied to the transistor 68 in the pre-amplifier and the pre-amplifier were provided with ideal characteristics, a signal 130 would be produced by the pre-amplifier. Actually, a signal 132 is produced by the pre-amplifier because of the distributed capacitances in the pre-amplifier, and particularly in the input to the pre-amplifier. The signal 132 may actually be considered as preferable to the signal 130 because it is more symmetrical than the signal 130. It is also more efficient than the signal 130 because the amplifiers demodulating the signal at the receiving position may employ full-wave rectification rather than half-wave rectification. Because of this, no attempt is made to change the characteristics of the signal 132 to those of the signal 130.

Certain other advantages result from the use of the electronic chopper as shown in FIGURE 3. For example, the photocell 52 can be disposed in closer proximity to the prism 40 with an electronic chopper than with a mechanical chopper since any requirements for the disposition of a chopper disc between the prism 40 and the photocell has been eliminated. Another advantage results from the use of germanium diodes rather than silicon diodes as the elements 72, 87 and 89. Germanium diodes are advantageous because the voltage drops across the diodes are less than the voltage drops with silicon diodes. Since the voltage drops across the diodes 72, 87 and 89 in the forward direction are relatively small, the potentiometer 80 can be adjusted on a very sensitive basis to minimize such extraneous effects as those of the distributed capacitance 90 and the offset effect of the transistor 64. In other words, a relatively large adjustment in the position of the movable arm of the potentiometer 80 produces only a relatively small adjustment in the output on the emitter of the transistor 64.

As will be seen at 100 in FIGURE 5, the document 14 at the receiver may be provided with response characteristics which are substantially uniform throughout the visual range of wavelengths. Actually, the response characteristics of the document decrease slightly from a peak value at wavelengths corresponding to a yellow color, reach a minimum at an intermediate wavelength in the visual range and then increase slightly with further progressive increases in wavelength in the visual range. The photocell 52 is provided with response characteristics similar to those indicated at 102 in FIGURE 5. As will be seen, the response of the photocell tends to increase relatively sharply with progressive increases in wavelength through the visual range.

A curve 104 illustrates the response characteristics of an optical filter 106 (FIGURE 2) when the optical filter has been used with a mechanical chopper as in application Ser. No. 436,504 specified above. As will be seen, the peak response of the filter is relatively high and occurs at relatively low wavelengths such as yellow colors in the visual range. The response of the filter has then decreased somewhat sharply with progressive increases in wavelengths through the visual range.

The return optically from red ink is illustrated at 108 in FIGURE 4. As will be seen, the return optically of red ink is at a minimum at wavelengths corresponding to yellow and orange and then increases somewhat sharply with progressive increases in wavelength through the visual range. As will be seen, the curve 108 intersects the curve 104 at a level 110 corresponding to a return optically of approximately 40% from red ink. This has inhibited red images from being reproduced as dark objects on the document 14 at the receiver, especially when the photocell 52 has a response as indicated at 102 in FIGURE 4.

As previously described, the output from the photocell 52 is considerably greater when an optical chopper is used than when a mechanical chopper is used. This has resulted from a variety of reasons, including the enhanced response of the photocell 52 at relatively high frequencies because of the discharge of the distributed capacitance 95 of the photocell through the transistor 64 during the time that the transistor 64 is conductive. For example, the voltage from the photocell 52 is as much as 10 times greater with the use of an electronic chopper such as illustrated in FIGURE 3 than with the use of a mechanical chopper such as disclosed in application Ser. No. 436,504 specified above.

Since the output from the photocell 52 with an electronic chopper is relatively great, the filter 106 can be provided with sharper response characteristics than that illustrated at 104 in FIGURE 4. For example, the filter 106 may be provided with response characteristics illustrated at 114 in FIGURE 4. Although the response characteristics of the curve 114 are less than those of the level 116 at wavelengths corresponding to a yellow color, they are still sufficiently great in such wavelengths to cause yellow to be reproduced on the document 14 as white. However, at wavelengths corresponding to the color red, the curve 108 representing the return optically from red ink intersects the curve 114 at a level 116 corresponding to approximately an 18% return. This causes such colors as red and orange to be reproduced as black on the document 14 with greater fidelity than when the filter 106 has the response illustrated by the curve 104.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for directing light to an image and for scanning progressive positions on the image with the light to obtain the production of signals having characteristics representing the image, photocell means for receiving from the image light having at each instant characteristics representing the characteristics of the image at the particular position being scanned and for producing signals having at each instant characteristics representing such light, the photocell means having a distributed capacitance capable of being charged by the signals produced by the photocell means, a current control member having conductive and non-conductive states, the current control member being connected to the photocell means to produce a discharge of the distributed capacitance in the photocell means in a particular one of the conductive and non-conductive states of the current control member, signal means operatively coupled to the current control member for alternately producing the conductive and non-conductive states of the current control member on a periodic basis, and means operatively coupled to the signal means and to the photocell means for mixing the signals from the photocell means and the signal means to produce a modulation of the signals from the photocell means at the frequency of the signals from the signal means.

2. The combination set forth in claim 1 wherein the photocell means are provided with response characteristics providing a progressively increasing response with progressive increases in wavelength and wherein filter means receive the light passing to the photocell means and have response characteristics providing a peak amplitude at a relatively low wavelength in the visual range and providing progressively decreasing amplitudes with progressively decreasing wavelengths in the visual range.

3. In combination for directing light to an image and for scanning progressive positions on the image with the light to obtain the production of signals having characteristics representing the image, photocell means disposed to receive at each instant light having characteristics representing the characteristics of a progressive position on the image and having characteristics to produce signals representative of such light, the photocell means having a distributed capacitance with characteristics of becoming charged by the signals from the photocell means, a current control member having conductive and non-conductive states, the current control member having a distributed capacitance for passing signals introduced to the current control member, first means connected to the current control member for introducing first signals to the current control member at a particular frequency to obtain alternately conductive and non-conductive states in the current control member at the particular frequency and the resultant production of signals at the particular frequency by the current control member, the current control member being connected to the photocell means to obtain a discharge of the distributed capacitance in the photocell means during a particular one of the conductive and non-conductive states of the current control member, second means connected to the current control member for neutralizing any tendency for the signals from the first means to pass through the distributed capacitance in the current control member, and third means connected to the current control member and the photocell means for mixing the signals from the photocell means and the signals from the current control member.

4. The combination set forth in claim 3 wherein adjustable means are connected to the second means to provide a control over the neutralizing effect produced by the second means and to provide a compensation for any offset effect in the voltage-current relationship of the current control member.

5. The combination set forth in claim 4 wherein the photocell means are provided with response characteristics progressively increasing with increases in wavelength through the visual range and wherein filter means are responsive to the light passing to the photocell means to pass a peak percentage at relatively low wavelengths in the visual range and to pass a progressively decreasing percentage with increases in wavelength through the visual range.

6. In combination for directing light to an image and for scanning progressive positions on the image with the light to obtain the production of signals having characteristics representing the image, photocell means for receiving from the image light having at each instant characteristics representing the characteristics of the image at the particular position being scanned and for producing at each instant signals having characteristics dependent upon the characteristics of the received light, first electronic means for periodically providing first signals at a first amplitude and second signals at a second amplitude different from the first amplitude, a current control member having first, second and third electrodes and having first and second states of operation, second electronic means connecting the first electronic means and the current control member for introducing the first and second signals to the first and second electrodes of the current control member to obtain an operation of the current control member in the first state during the introduction of the first signals to the current control member and to obtain an operation of the current control member in the second state during the introduction of the second signals to the current control member, the current control member having distributed capacitances tending to pass the first signals through the current control member to the third electrode of the current control member, third electronic means for periodically providing third and fourth signals in a particular phase relationship to the first and second signals from the first electronic means, fourth electronic means connecting the third electronic means and the current control member for introducing the third and fourth signals from the third electronic means to the first and third electrodes of the current control member to neutralize the operation of the distributed capacitance in the current control member of passing the first signals from the first electronic means through the current control member to the third electrode, and means connected to the third electrode of the current control member and to the photocell means for modulating the signals from the photocell means with the signals from the third electrode of the current control member.

7. The combination set forth in claim 6 wherein the first electronic means produces the first and second signals with substantially rectangular characteristics and the third electronic means produces the third and fourth signals with substantially rectangular characteristics and the fourth electronic means include adjustable means for adjusting the amplitude of the fourth signals from the second electronic means relative to the amplitude of the first signals passing through the distributed capacitance to the third electrode of the current control member to neutralize the effect of the distributed capacitance.

8. In combination for directing light to an image and for scanning progressive positions on the image with the light to obtain the production of signals having characteristics representing the image, photocell means for receiving from the image light having at each instant characteristics representing the characteristics of the image at the particular position being scanned and for producing at each instant signals having characteristics representing the characteristics of the received light, first electronic means for periodically producing first and second signals of rectangular characteristics, second electronic means for periodically producing third and fourth signals of rectangular characteristics and with a particular out-of-phase relationship to the first and second signals from the first electronic means, a current control member having first, second and third electrodes and having a distributed capacitance between the second and third electrodes for passing signals from the second electrode to the third electrode, third electronic means interconnecting the first electronic means to the first and second electrodes of the current control member for introducing the first and second signals from the first electronic means to the second electrode, fourth electronic means interconnecting the second electronic means to the second and third electrodes of the current control member for introducing the third and fourth signals from the second electronic means to the third electrode, the fourth electronic means including means for adjusting the amplitude of the third and fourth signals from the second electronic means to neutralize the passage of the first signals from the first current control member through the distributed capacitance in the current control member, and amplifier means connected to the third electrode of the current control member and to the photocell means for modulating the signals from the photocell means with the signals from the third electrode of the current control member.

9. The combination set forth in claim 8 wherein the third electronic means include means for limiting the amplitude of the second signals from the first electronic means and wherein the fourth electronic means include means for limiting the amplitudes of the third and fourth signals from the second electronic means.

10. In combination for directing light to an image and for scanning progressive positions on the image with the light to obtain the production of signals having characteristics representing the image, photocell means for receiving from the image light having at each instant characteristics representing the characteristics of the image at the particular position being scanned and for producing signals having characteristics in accordance with the characteristics of the light received, filter means disposed optically between the photocell means and the image for providing a peak response at relatively low wavelengths in the visual range and for providing a sharp decrease in response at increased wavelengths in the visual range to obtain the production by the photocell means of signals representing a white color for indications on the image at the wavelengths representing yellow and to obtain the production by the photocell means of signals representing a black color for indications on the image at wavelengths representing red, the photocell means having sharply rising response characteristics with increases in wavelength to obtain the production by the photocell means, in combination with the filter means, of signals representing a black color for indications on the image at wavelengths representing blue and green, electronic means for producing modulating signals at a particular frequency, and means coupled to the electronic means and the modulating means for modulating the signals from the photocell means by the modulating signals.

11. The combination set forth in claim 10 wherein the photocell means have a distributed capacitance capable of being charged by the signals produced by the photocell means and wherein the electronic means are connected to the photocell means to discharge the distributed capacitance of the photocell means in each cycle of the modulating signals at the particular frequency.

12. The combination set forth in claim 11 wherein the electronic means have a distributed capacitance and wherein means are included in the electronic means for compensating for the effect of the distributed capacitance.

13. In combination for directing light to an image and for scanning progressive positions on the image with the light to obtain the production of signals having characteristics representing the image, photocell means for receiving from the image light having at each instant characteristics representing the characteristics of the image at the particular position being scanned and for producing signals having characteristics dependent upon the characteristics of the light received, filter means disposed optically between the photocell means and the image for providing a peak response at relatively low wavelengths in the visual range and for providing a sharp decrease in response at increased wavelengths in the visual range to obtain the production by the photocell means of signals representing a white color for indications on the image at the wavelengths representing the color yellow and to obtain the production by the photocell means of signals representing a black color for indications on the image at wavelengths representing the color red, the photocell means having sharply rising response characteristics with increases in wavelength to obtain the production by the photocell means, in combination with the filter means, of signals representing a black color for indications on the image at wavelengths representing blue and green, a current control member having first, second and third electrodes and having first and second states of operation, first electronic means connected between the first and second electrodes of the current control member for periodically introducing to the current control member at a particular frequency first signals at a first amplitude and second signals at a second amplitude different from the first amplitude, and second electronic means connected to the second and third electrodes of the current control member for mixing the signals from the photocell means and the signals produced between the second and third electrodes of the current control member.

14. The combination set forth in claim 13 wherein the photocell means have a distributed capacitance and wherein the current control member is connected to the photocell means to periodically obtain a discharge of the photocell means at the particular frequency and wherein the current control member has a distributed capacitance and wherein the second means is connected to the second and third electrodes of the current control member to neutralize the effect of the distributed capacitance.

References Cited

UNITED STATES PATENTS

| | | | |
|---|---|---|---|
| 2,927,216 | 3/1960 | Lohninger | 250—219 X |
| 3,226,652 | 12/1965 | Auger | 330—27 X |
| 3,268,732 | 8/1966 | Grieder | 250—206 |
| 3,287,653 | 11/1966 | Goordman | 330—27 X |

WALTER STOLWEIN, Primary Examiner

U.S. Cl. X.R.

178—7.6; 250—214; 330—27